United States Patent
Hudson

[11] Patent Number: 5,199,318
[45] Date of Patent: Apr. 6, 1993

[54] DEVICE FOR RESTRAINING CONNECTING ROD ON A CRANKSHAFT

[75] Inventor: Eric B. Hudson, Hilbert, Wis.

[73] Assignee: Tecumseh Products Company, Tecumseh, Mich.

[21] Appl. No.: 796,405

[22] Filed: Nov. 22, 1991

[51] Int. Cl.⁵ .................... F16C 3/04; G05G 1/00
[52] U.S. Cl. ...................... 74/595; 74/579 E; 74/579 R; 123/197.3; 123/197.4; 403/355
[58] Field of Search .............. 123/197.3, 197.4; 403/355, 373, 374, 378; 74/567, 595, 596, 597, 598, 579 R, 579 E

[56] References Cited

U.S. PATENT DOCUMENTS

| | | | |
|---|---|---|---|
| 3,024,326 | 3/1962 | Wischhusen | 403/355 X |
| 4,085,628 | 4/1978 | McWhorter | 123/197.3 X |
| 4,433,655 | 2/1984 | Villella | 123/197.3 X |
| 4,467,756 | 8/1984 | McWhorter | 74/595 X |
| 4,494,286 | 1/1985 | Kaufman | 74/579 E X |
| 4,512,292 | 4/1985 | Hundertmark | 123/197.4 X |
| 4,546,670 | 10/1985 | Gaspardo | 74/595 |
| 4,559,686 | 12/1985 | Kessler | 74/595 X |
| 4,886,023 | 12/1989 | Werner et al. | 123/197 |
| 4,902,162 | 2/1990 | Watt | 403/355 |
| 4,957,069 | 9/1990 | Mederer | 123/197.3 X |
| 5,009,123 | 4/1991 | Hiraoka et al. | 74/567 |

FOREIGN PATENT DOCUMENTS

| | | | |
|---|---|---|---|
| 0113320 | 7/1984 | European Pat. Off. | 123/197.3 |
| 437468 | 11/1926 | Fed. Rep. of Germany | 403/355 |

Primary Examiner—Vinh T. Luong
Attorney, Agent, or Firm—Baker & Daniels

[57] ABSTRACT

A crankshaft and connecting rod assembly, and method of assembling same, including a crankshaft having a tapered end, a crankpin, and a one piece connecting rod having a large end that is slipped over the tapered end of the crankshaft and onto the crankpin. A radially protruding portion is formed on the crankpin such that a leading face of the bearing assembly of the large end abuts the protruding portion. Thereafter, a retaining pin is inserted into a radially extending hole in the crankshaft such that the retaining pin retains a second and opposite bearing surface of the large end of the connecting rod, thereby preventing the connecting rod from excessive axial movement along the crankpin. The retaining pin is preferably a spring-like roll pin that is resiliently and frictionally press fit into the hole.

16 Claims, 3 Drawing Sheets

DEVICE FOR RESTRAINING CONNECTING ROD ON A CRANKSHAFT

BACKGROUND OF THE INVENTION

The present invention relates generally to connecting rods for coupling crankshafts and pistons, and more particularly to the coupling of the large end of a one piece connecting rod to the crankshaft.

Connecting rods for coupling pistons and crankshafts are designed with a small ring-shaped end and a large ring-shaped end joined together by a rigid member that is connected to the outer periphery of each ring portion. The small ring-shaped end is designed as a bushing or as a press-fit connection for receiving a bearing for rotatably receiving a piston pin, and the large end is designed for rotationally receiving the crankpin journal.

Most simple connecting rods may be broadly categorized in two types. The first more complex and expensive type is a split ring connecting rod. In such connecting rods, the large end surrounding the crankshaft is formed as two C-shaped halves, each containing an inner bearing surface and either bolted together across the joint or split formed by the ends of the C-shaped section in position about the crankshaft. The second type is a one piece connecting rod in which the ring section forming a bearing around the crankpin is continuous, without bolted joints. The simplicity of the one piece connecting rod is offset by more demanding considerations in crankshaft design. One piece connecting rods require the crankshaft to be either assembled around the connecting rods or to be designed in such a way as to allow the engine to be assembled by passing the large circular shaped end of the connecting rods over an end of the crankshaft and along the crankshaft onto the crankpin. The present invention applies mainly to the on piece type of connecting rod used with crankshafts designed to allow the connecting rod to be assembled over crankpins.

Although the manufacture and assembly of this type of one piece connecting rod and crankshaft is inexpensive in comparison to the split ring connecting rod, there are problems of retaining the one piece rod in position on the crankshaft during engine operation. This is because, by design, the end of the connecting rod can slip on and off the crankshaft. In such assemblies, the rod may be guided in the direction of the crankshaft axis by a piston and/or wrist pin between the piston pin bosses on either side of the small end of the rod. Piston guided rods work acceptably as long as the forces tending to move the rod axially on the crank arm are small. In order to keep axial forces to a minimum, the rolling elements or rollers of the connecting rod bearings must remain aligned parallel to the crankpin axis.

In expensive engines, a bearing cage may be utilized to maintain the rollers in proper alignment. However, in less expensive engines in which bearing cages are not utilized, roller alignment is difficult to maintain because of tolerance variations. Once a roller or rollers skew and are no longer in alignment, axial forces in the rod may be generated which tend to move the large end of the rod axially on the crankpin. Such movement can cause binding of the bearing on the crankpin as the rod that is restrained at the top by the piston is cocked by axial loads on the large end of the rod. The large lever arm provided by the rod transmits rather large forces to the piston from the axial forces generated by the crankpin bearing. Thus, in addition to binding the crankpin bearing, roller misalignment or skewness can cause high piston loads and wear.

In some engines, the connecting rod is guided by shoulders on either side of the crankpin of the crankshaft. With crankshafts designed to permit the connecting rod to be passed over the end of the shaft until the connecting rod is in position, axial movement of the connecting rod may be restrained in one direction by a thrust flange integral with the crankshaft. However, no restraint is provided on the other side of the rod, resulting in a tendency for the rod to "walk" along the crankshaft. It is thereby desired to prevent excessive axial movement of the connecting rod along the crankshaft.

SUMMARY OF THE INVENTION

The present invention overcomes the problems and disadvantages of the above-described prior art connecting rod arrangements by providing a retaining device that is attachable to the crankshaft after the large end of the connecting rod is slipped over the tapered end of the crankshaft and onto the crankpin, wherein the retaining device prevents axial movement of the connecting rod along the crankshaft in a direction back toward the tapered end of the crankshaft.

In general, the present invention provides a crankshaft having a tapered end for a flywheel, an opposite end having a power takeoff, and a crankpin that is eccentric to the crankshaft and includes a radially protruding portion. A slip-on connecting rod is slipped over the tapered end and crankpin until the large end of the connecting rod abuts the protruding portion on the crankpin, thereby preventing any further axial movement of the rod in that direction. The rod is retained in place by a retaining device that is secured to the crankshaft to prevent axial movement of the connecting rod along the crankshaft in a direction toward the tapered end of the crankshaft.

More particularly, the invention provides, in one form thereof, a crankshaft having a crankpin in which a hole is drilled radially therethrough through a plane of the neutral axis in bending. The hole is axially spaced from the protruding portion on the crankpin such that a retaining pin may be inserted into the hole after the leading surface of the large end bearing of the connecting rod abuts the protruding portion, wherein the retaining pin abuts the opposite surface of the large end bearing of the connecting rod, thereby preventing most axial movement of the connecting rod along the crankpin. Preferably, the retaining pin is a spring-like roll pin that is resiliently and frictionally retained within the hole by a press fit.

An advantage of the present invention is that the connecting rod is retained on the crankpin at the large end bearing instead of being guided at the piston pin bosses, thereby better controlling axial forces, binding and rod movement.

Another advantage of the present invention is that the retaining pin is easily attached to the crankshaft after the connecting rod is positioned on the crankpin.

A further advantage of the present invention is that the retaining pin does not prevent lubricant in the crankcase from reaching the bearing assembly at the large end of th connecting rod.

Yet another advantage of the present invention is that the retaining pin is resilient to accommodate size variations in drilled holes, thereby allowing relatively liberal manufacturing tolerances on the press fits.

The invention, in one form thereof, provides an assembly including a crankshaft having an eccentric portion or crankpin and a connecting rod having an end disposed about the crankpin, wherein the connecting rod end includes a first face and an opposite second face. The assembly further includes a radially protruding thrust flange portion integral with the crankpin such that the first face of the connecting rod end generally abuts the radially protruding portion. A retainer is received within an opening in the crankpin such that the second face of the connecting rod end generally abuts the retainer. The radially protruding portion and the retainer prevent significant axial movement of the rod along the crankshaft.

The invention further provides, in one form thereof, a method of assembling together a crankshaft and a connecting rod. The method includes first passing the connecting rod end over the crankshaft for generally concentric alignment with the crankshaft until a first face of the connect rod end abuts a radially protruding portion that is integral with the crankshaft. A retaining device is then attached to the crankshaft adjacent a second face that is opposite the first face of the connecting rod end. The protruding portion and the retaining device prevent axial movement of the rod along the crankshaft.

DESCRIPTION OF THE PREFERRED EMBODIMENT

Figure 1:
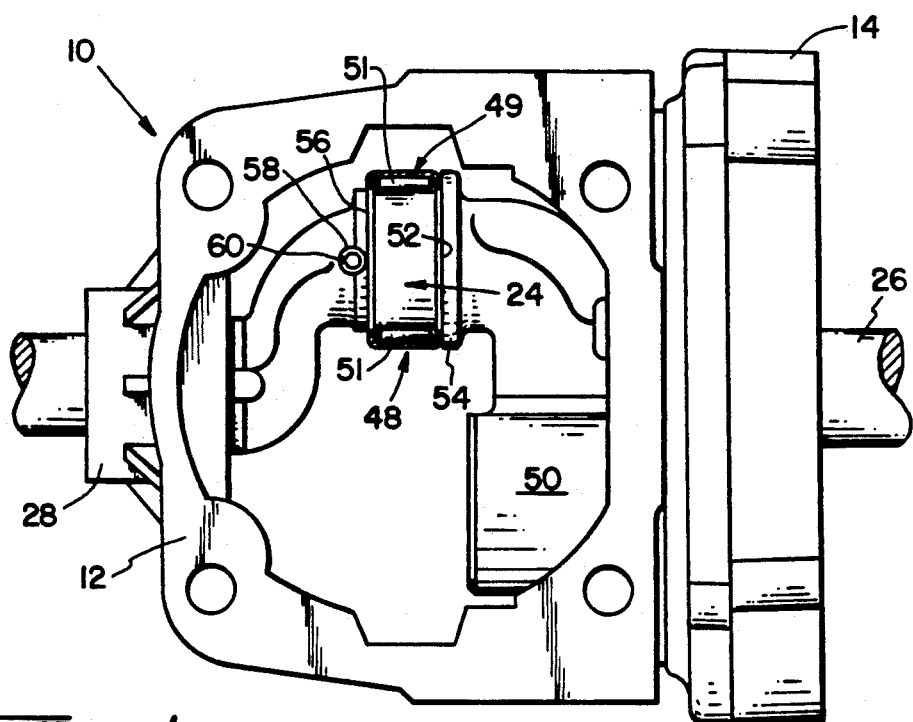
FIG. 1 is a top view of a small internal combustion engine embodying the present invention in accordance with one form thereof, wherein the engine is without the connecting rod and piston.
Figure 2:
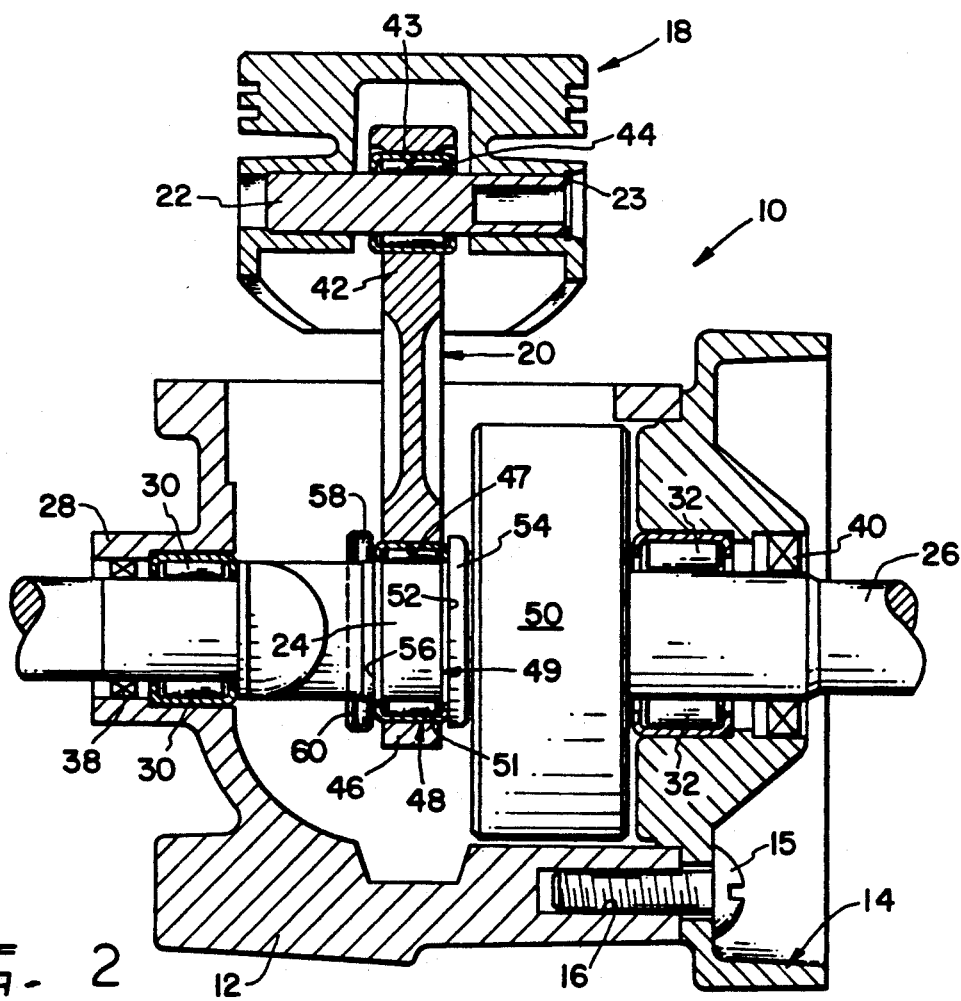
FIG. 2 is a side elevational view in cross-section of the engine of FIG. 1, showing the connecting rod and piston assembled on the crankpin.

Referring now the drawings, and in particular to FIGS. 1 and 2, there is shown an internal combustion engine 10 having a die cast crankcase 12 to which is mounted a cover 14 by screw 15 which are received within threaded openings 16. Within the combustion cylinder (not shown) there is slidably received, for reciprocating motion, a piston 18 pivotally connected to a connecting rod 20 by a piston pin 22 and a piston pin retainer ring 23. Connecting rod 20 is pivotally connected to a crankpin 24 of crankshaft 26. Crankshaft 26 is rotatably mounted, at one end thereof, within a cylindrical bearing boss 28 of crankcase 12. Referring to FIG. 2, crankshaft 26 is disposed within rolling element bearings 30 and 32. Crankshaft to crankcase joints are sealed by seals 38 and 40.

Connecting rod 20 includes a small end 42 having an opening 43 therein with a rolling element bearing 44 disposed in opening 43. The opposite end of connecting rod 20 is the large end 46 having an opening 47 therein and a rolling element bearing 48, which is disposed about crankpin 24. A counterweight 50 balances some of the forces generated by the action of piston 18 and connecting rod 20. Bearing assembly 48 includes a steel shell 49 having a leading face 52 and a trailing face 56, which is opposite face 52. Steel shell 49 is press fit within opening 47. Needle bearings or rolling elements 51 are received within shell 49.

Figure 3:
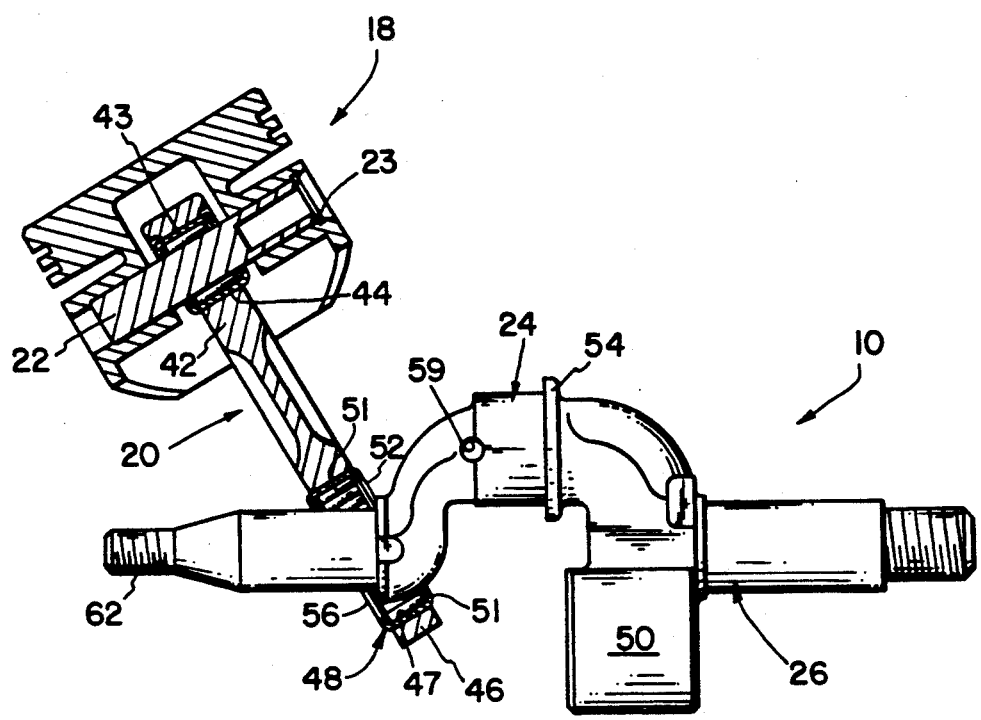
FIG. 3 is an isolated view of a crankshaft and a piston connecting rod, particularly showing the large end of the connecting rod in the process of being passed over the end of the crankshaft for location of the connecting rod on the crankpin.

In accordance with an embodiment of the present invention, leading face 52 of bearing assembly 48 lies adjacent a generally annular radially protruding portion or flange 54 integral with crankshaft 26. Face 56 of bearing assembly 48 adjacently engages a roll pin 58 that is pressed into a drilled hole 59 in crankshaft 26. Hole 59 extends radially through a plane approximately of the neutral axis in bending, as shown in FIGS. 1 and 3. Roll pin 58 is generally cylindrical in shape and includes a longitudinally extending slit 60 which allows roll pin 58 to be resiliently received within hole 59 in the crankshaft. Since roll pin 58 is resilient in nature, it will accommodate some size variation in drilled holes due to the ability of the roll pin to deflect radially. Roll pin 58 is essentially press fit into drilled hole 59 such that the ends of pin 58 extend radially beyond crankpin 24. Flange 54 and roll pin 58 together prevent excessive axial movement of the connecting rod along crankpin 24.

Figure 4:
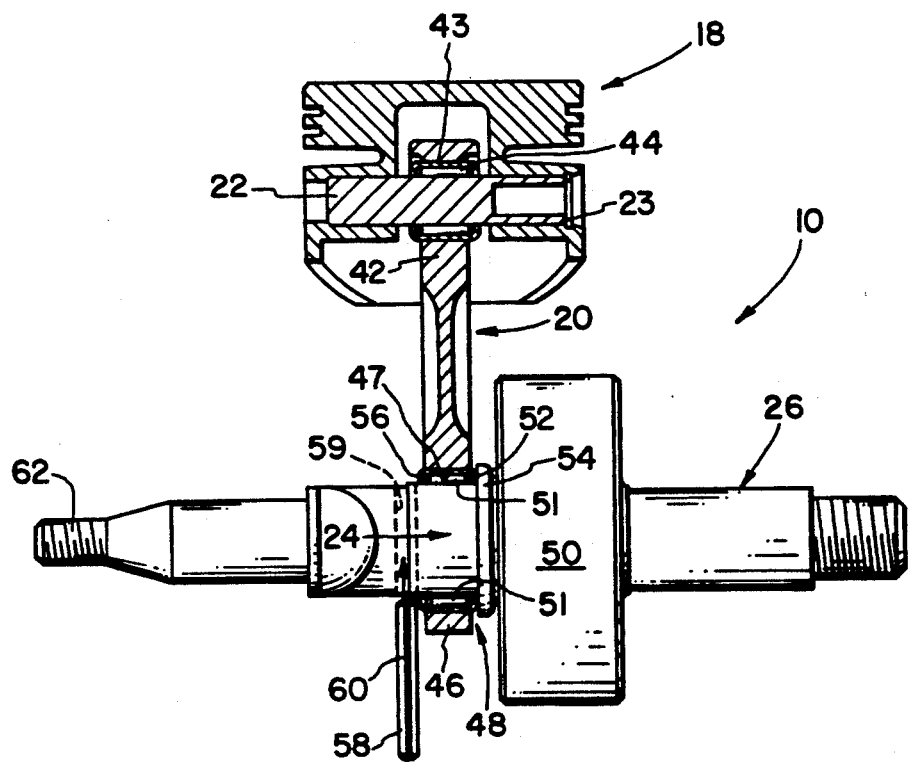
FIG. 4 is a view of the crankshaft shown in FIG. 3, rotated 90° and particularly showing the correctly located connecting rod bearing abutting a flanged portion of the crankshaft and a retaining pin being inserted into a hole in the crankpin.

The method of easily and quickly assembling piston 18 and connecting rod 20 onto crankshaft 26 is illustrated in FIGS. 3 and 4. As shown in FIG. 3, large end 46 and bearing assembly 48 of connecting rod 20 is passed over tapered end 62 of crankshaft 26 until front surface 52 of bearing 48 abuts annular protruding flange 54. Flange 54 prevents any further forward axial movement of connecting rod 20 along crankshaft 26. To prevent movement in the opposite direction, roll pin 58 is then inserted into drilled bore 59, preferably by a press fit.

Figure 5:
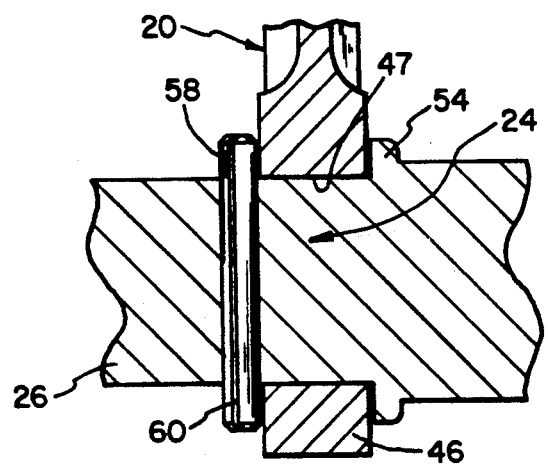
FIG. 5 is an enlarged sectional view of a portion of a crankshaft and the lower portion of a piston connecting rod, particularly showing an alternative embodiment to he rod retaining assembly illustrated in FIGS. 1-4.
Figure 6:
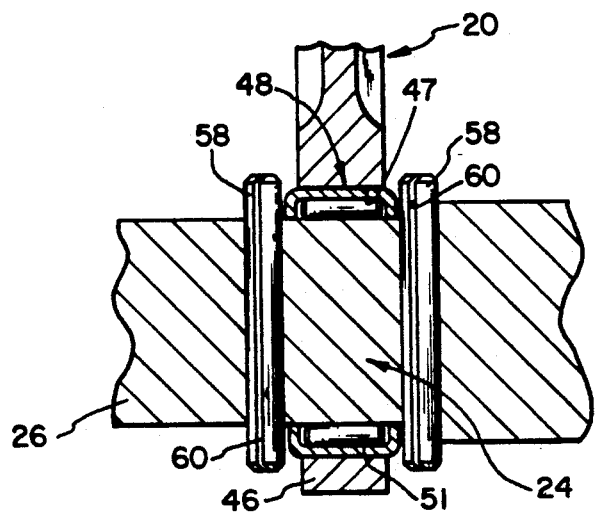
FIG. 6 is an alternative embodiment to the assembly of FIG. 5.
Figure 7:
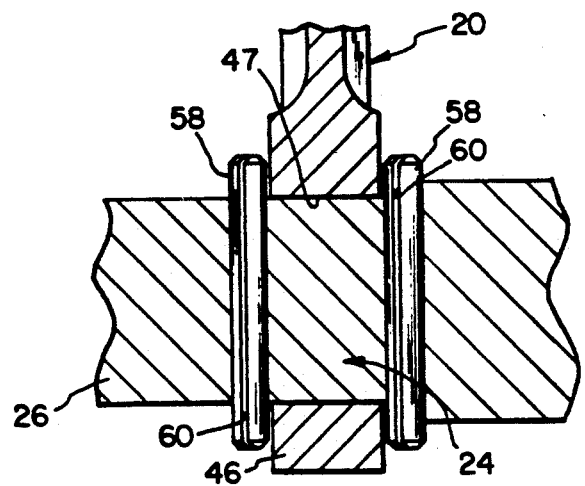
FIG. 7 is yet another alternative embodiment to the assembly of FIG. 5.

Although the roll pin and flange as described above is a preferred retaining assembly, other devices may be used to retain large end 46 of connecting rod 20 along crankshaft 46. In addition, flange 54 can be replaced by a second roll pin (See FIGS. 5-7).

It will be appreciated that the foregoing is presented by way of illustration only, and not by way of any limitation, and that various alternatives and modifications may be made to the illustrated embodiment without departing from the spirit and scope of the invention.

What is claimed is:

1. An assembly comprising:
    a crankshaft having a crankpin;
    a connecting rod having an end with a first opening therein disposed around said crankpin, said connecting rod end having a first face and an opposite second face;
    said crankshaft having a radially protruding portion integral with said crankpin, wherein said first face of said connecting rod end abuts said radially protruding portion; and
    a retainer received in a second opening in said crankpin, wherein said second face of said connecting rod end abuts said retainer, wherein said radially protruding portion and said retainer prevent excessive axial movement of said connecting rod along said crankshaft 2. The assembly according to claim 1, wherein said retainer is generally cylindrical in shape and is received within said opening.

3. The assembly according to claim 2, wherein said retainer includes a longitudinally extending slit for providing resilience to said retainer.

4. The assembly according to claim 1, wherein said connecting rod rotates along a first axis, and said opening defines a second axis that is generally perpendicular to said first axis.

5. The assembly according to claim 1, wherein said retainer is a roll pin.

6. The assembly according to claim 1, wherein said retainer extends beyond a diametrically opposite side of said crankshaft.

7. An assembly comprising:
a crankshaft having a crankpin;
a connecting rod having an end with a first opening therein disposed around said crankpin;
a bearing assembly comprising a shell received in said first opening and in concentric alignment with a group of rollers that are positioned about said crankpin, said shell having a first face and an opposite second face;
said crankshaft having a radially protruding portion integral with said crankpin, wherein said first face of said shell generally abuts said radially protruding portion; and
a retainer received in a second opening in said eccentric portion, wherein said second face generally abuts said retainer, wherein said radially protruding portion and said retainer prevent excessive axial movement of said connecting rod along said crankshaft.

8. The assembly according to claim 7, wherein said retainer is generally cylindrical in shape.

9. The assembly according to claim 8, wherein said retainer includes a longitudinally extending slit for providing resilience to said retainer.

10. The assembly according to claim 7, wherein said connecting rod rotates along a first axis, and said opening defines a second axis that is generally perpendicular to said first axis.

11. The assembly according to claim 7, wherein said retainer is a roll pin.

12. The assembly according to claim 7, wherein said retainer extends beyond a diametrically opposite side of said crankshaft.

13. An assembly comprising:
a crankshaft having a crankpin;
a connecting rod having an end that is disposed around said crankpin, said connecting rod end having a first face and an opposite second face;
a first retainer received in a first opening in said crankpin, wherein said first face of said connecting rod end generally abuts said first retainer; and
a second retainer received in a second opening in said crankpin, wherein said second face of said connecting rod end generally abuts said second retainer, wherein said first retainer and said second retainer prevent excessive axial movement of said connecting rod along said crankshaft.

14. The assembly according to claim 13, wherein said first retainer is generally cylindrical in shape and is received within said first opening.

15. The assembly according to claim 14, wherein said first retainer includes a longitudinally extending slit for providing resilience to said retainer.

16. The assembly according to claim 13, wherein said first retainer and said second retainer is each a roll pin.

* * * * *